(12) United States Patent
Setlhaku

(10) Patent No.: US 10,066,030 B2
(45) Date of Patent: Sep. 4, 2018

(54) RECOVERY OF HYDROCARBONS FROM A HYDROCARBON RECYCLE

(71) Applicant: SABIC Global Technologies B.V., Bergen op Zoom (NL)

(72) Inventor: Mpho Prudence Setlhaku, Geleen (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 15/538,501

(22) PCT Filed: Dec. 22, 2015

(86) PCT No.: PCT/EP2015/080939
§ 371 (c)(1),
(2) Date: Jun. 21, 2017

(87) PCT Pub. No.: WO2016/102544
PCT Pub. Date: Jun. 30, 2016

(65) Prior Publication Data
US 2018/0002458 A1    Jan. 4, 2018

(30) Foreign Application Priority Data
Dec. 22, 2014  (EP) .................................... 14199599

(51) Int. Cl.
C08F 2/00        (2006.01)
C08F 4/42        (2006.01)
(Continued)

(52) U.S. Cl.
CPC .................. *C08F 2/34* (2013.01); *C08F 2/06* (2013.01); *C08F 4/022* (2013.01);
(Continued)

(58) Field of Classification Search
CPC ...... C08F 2/04; C08F 2/06; C08F 2/12; C08F 2/18; C08F 2/31; C08F 2/34; C08J 11/02; B01J 8/18
(Continued)

(56) References Cited

U.S. PATENT DOCUMENTS 2,825,721 A    3/1958  Hogan et al.
3,023,203 A    2/1962  Dye
(Continued)

FOREIGN PATENT DOCUMENTS

WO        0198239 A1      12/2001
WO     2006130310 A1      12/2006

OTHER PUBLICATIONS

International Search Report for International Application No. PCT/EP2015/080939; dated Mar. 16, 2016; 5 pages.
(Continued)

*Primary Examiner* — William K Cheung
(74) *Attorney, Agent, or Firm* — Cantor Colburn LLP

(57) ABSTRACT

The invention relates to a process for the polymerization of olefins comprising the comprising the steps of a. Polymerizing olefins in a reaction mixture comprising monomers, diluent, processing aids to prepare a product stream comprising polyolefins, monomers and diluent; b. Removing the polyolefins from the product stream to obtain a purge stream; c. Removing gaseous components from the purge stream to obtain a liquid fraction; d. Treating the liquid fraction with at least one ionic liquid to obtain a fraction containing unsaturated hydrocarbons; e. Recycling the fraction containing unsaturated hydrocarbons to the reaction mixture, optionally after purification of said fraction containing unsaturated hydrocarbons. The invention also relates to an olefin polymerization system comprising a polymerization reactor, a purge vessel, a vent gas recovery and an
(Continued)

ionic liquid separator for separating liquid alkenes from liquid alkanes, wherein the liquid alkenes which are separated from the alkanes in the ionic liquid separator can be recycled to the polymerization reactor.

14 Claims, 1 Drawing Sheet

(51) Int. Cl.

| | | |
|---|---|---|
| *C08F 210/00* | (2006.01) | |
| *C08F 2/34* | (2006.01) | |
| *C08F 2/06* | (2006.01) | |
| *C08F 210/02* | (2006.01) | |
| *C08F 210/06* | (2006.01) | |
| *C08F 210/08* | (2006.01) | |
| *C08F 210/14* | (2006.01) | |
| *C08F 4/02* | (2006.01) | |
| *C08F 4/6192* | (2006.01) | |
| *C08J 11/02* | (2006.01) | |

(52) U.S. Cl.
CPC ........ *C08F 4/61927* (2013.01); *C08F 210/02* (2013.01); *C08F 210/06* (2013.01); *C08F 210/08* (2013.01); *C08F 210/14* (2013.01); *C08J 11/02* (2013.01)

(58) Field of Classification Search
USPC .................................. 526/67, 68, 348, 89, 90
See application file for complete search history.

(56) References Cited

U.S. PATENT DOCUMENTS

| | | |
|---|---|---|
| 3,622,521 A | 11/1971 | Hogan et al. |
| 3,687,920 A | 8/1972 | Johnson |
| 4,011,382 A | 3/1977 | Levine et al. |
| 4,086,408 A | 4/1978 | Karol et al. |
| 4,101,445 A | 7/1978 | Levine et al. |
| 4,376,191 A | 3/1983 | Geck |
| 4,482,687 A | 11/1984 | Noshay et al. |
| 4,560,671 A | 12/1985 | Gross et al. |
| 4,719,193 A | 1/1988 | Levine et al. |
| 4,755,495 A | 7/1988 | Cann et al. |
| 5,019,633 A | 5/1991 | Wagner et al. |
| 5,070,055 A | 12/1991 | Schramm et al. |
| 6,623,659 B2 * | 9/2003 | Munson .................. C07B 63/00 252/184 |
| 7,435,318 B2 | 10/2008 | Arlt et al. |
| 2012/0296145 A1 * | 11/2012 | Lacheen ............ G01N 21/3577 585/501 |
| 2015/0005459 A1 * | 1/2015 | Janssens ................. C08F 6/001 526/68 |

OTHER PUBLICATIONS

Written Opinion of the International Search Report for International Application No. PCT/EP2015/080939; dated Mar. 16, 2016; 4 pages.

* cited by examiner

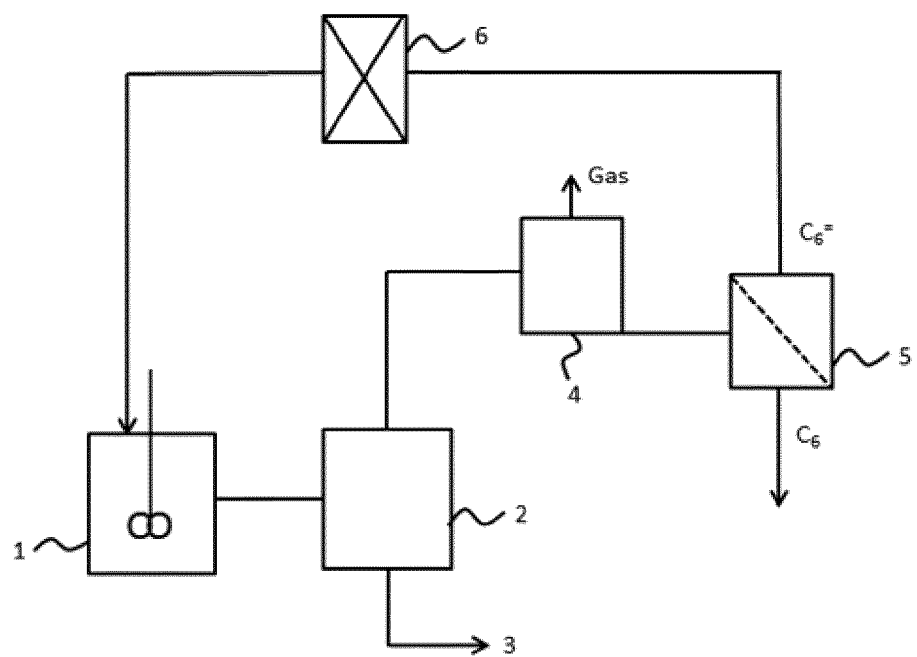

RECOVERY OF HYDROCARBONS FROM A HYDROCARBON RECYCLE

CROSS REFERENCE TO RELATED APPLICATIONS

This application is a 371 of International Application No. PCT/EP2015/080939, filed Dec. 22, 2015, which claims priority to European Application No. 14199599.3, filed Dec. 22, 2014, both of which are incorporated herein by reference in their entirety.

The invention relates to a process for recovery of hydrocarbons from a liquid stream in an olefin polymerization plant.

Olefin polymerization plants are well known in the art. The polymerization plants can be gas phase plants, slurry plants and solution polymerization plants.

Each plant contains recycle streams, to capture unreacted monomers and feed these unreacted monomers to the polymerization reactor.

The polymerization of olefin monomers can be catalyzed by for example Ziegler-Natta, or metallocene catalyst systems. Each catalyst system has its own characteristics, its own chemistry and specific components. For example a catalyst system may contain polar components, like Lewis bases, internal and external donors, alcohols, esters, ethers and the like.

Every polymerization plant is designed to handle a specific catalyst component. An excess of polar components can be removed to sufficiently low levels.

The cost of making polyolefins on large scale is determined by a number of factors. One of the factors is the recycle efficiency of monomers. Especially when LLDPE is being produced a comonomer is used, for example 1-butene, 1-hexene or 1-octene.

Conversion of the comonomer is generally very low, for example between 10 and 20%; this means that 80-90% of the comonomer passes the reactor without being converted to polymer. This comonomer should ideally be recycled to the reactor in order to be able to be polymerized.

Recycling of these comonomers is however difficult, especially when also saturated hydrocarbons are present, for example butane, hexane and octane. Boiling points of the saturated and unsaturated monomers are very close, which makes separation difficult. Recycling of volatile monomers like ethylene may be very efficient, like for example at least 98% of the ethylene can be recycled in the polymerization plants. Therefore usually less than 2% of the ethylene is lost in the process of recycling monomers to the polymerization reactor. Comonomer losses are much higher, usually around 10% for 1-butene, to about 50% for 1-hexene.

Sometimes mixtures of saturated and unsaturated hydrocarbons can be recycled to the reactor, but in other cases the mixture needs to be disposed of. This disposal adds to the cost of a polymerization plant and also negatively influences the carbon dioxide food print of polymers produced.

Moreover, in case ethylene is polymerized in a polymerization plant alternately Ziegler-Natta catalysts and metallocene catalysts, this recycle problem is even larger. Apart from saturated and unsaturated hydrocarbons, the liquid streams may also contain polar catalyst components that may deactivate sensitive metallocene catalysts.

It is an object of the present invention to provide an improved polymerization process which can separate and/or purify the comonomer recycle stream to reduce cost, increase efficiency, improve polymerization control and/or make the polymerization process suitable for use with different types of catalysts, like metallocene and Ziegler-Natta catalysts.

The invention relates to a process for the polymerization of olefins comprising the steps of
   a. Polymerizing olefins in a reaction mixture comprising monomers, diluent, processing aids to prepare a product stream comprising polyolefins, monomers and diluent;
   b. Removing the polyolefins from the product stream to obtain a purge stream;
   c. Removing gaseous components from the purge stream to obtain a liquid fraction;
   d. Treating the liquid fraction with at least one ionic liquid to obtain a fraction containing unsaturated hydrocarbons;
   e. Recycling the fraction containing unsaturated hydrocarbons to the reaction mixture, optionally after purification of said fraction containing unsaturated hydrocarbons.

In step a of the process according to the invention olefins are polymerized. Polymerization of olefins can be performed in slurry, gas phase or solution polymerization plants.

In slurry plants, the reactants are dissolved in a solvent/dispersant and polymerization is conducted at a temperature below the crystallization temperature of the polyolefin. In that case a slurry of polyolefin in solvent is obtained. Examples of solvents used are pentane, hexane and toluene; preferably pentane or hexane are being applied. When solvents such as hexane are being used, the separation of hexane from 1-hexene, which can be used as comonomer, is difficult due to the small difference in boiling points between hexane and 1-hexene.

Solution polymerization is conducted in a solvent at a temperature above the crystallization temperature of the polyolefin produced, so that a solution of polymer in a solvent is obtained. Examples of suitable solvents are hexane, heptane, toluene and the like.

In gas phase polymerization, the polymerization is conducted in a fluidized bed containing monomer, polymer and also polymerization additives like butane, pentane and the like for removing the heat of polymerization and keep control of the polymerization system. Preferably, the polymerization is carried out in the gas phase in the process according to the present invention.

In all cases substantial amounts of hydrocarbons like hexane can be present, which will mix with the unconverted 1-hexene comonomer.

In the above-mentioned polymerization plants a reaction mixture comprising monomers, diluent and processing aids are present. During polymerization a product stream is prepared that comprises polyolefins, monomers and diluent.

Monomer

Monomers that can be present in the reaction mixture for the polymerization of olefins are olefins with 1-20 carbon atoms; for example ethylene, propylene, butene, pentene, hexene, heptene, octene, decene, dodecene or hexadecene. Preferably, the monomers are chosen from the group of ethylene, propylene, 1-butene, 1-hexene, 1-octene and mixtures of these monomers. More preferably, a monomer mixture that can form LLDPE is present. More preferably, the monomer mixtures comprise ethylene and 1-butene, 1-hexene or 1-octene, most preferably the monomer mixture comprises ethylene and 1-hexene.

Diluent

A diluent is an additive to the polymerization plant that may dilute the contents in the polymerization reactor. In slurry and solution polymerization processes the diluent may be the solvent that is present during polymerization. In gas phase polymerization processes the diluent may be introduced by the addition of the catalyst or with other liquid feed, like for example comonomer.

Processing Aid

Processing aids are additives to the polymerization plant that are necessary for the polymerization of the monomers. Examples of processing aids are the catalyst and the cocatalyst that are present during the polymerization. The catalyst can, for example, be a traditional Ziegler-Natta catalyst, a chromium-based catalyst or a metallocene catalyst.

Ziegler-Natta Catalyst

Traditional Ziegler-Natta catalysts comprise a transition metal halide, such as titanium or vanadium halide, and an organometallic compound of a metal of Group 1, 2 or 3, typically trialkylaluminum compounds, which serve as an activator or a co-catalyst for the transition metal halide. Some Ziegler-Natta catalyst systems incorporate an internal electron donor which is complexed to the alkyl aluminum or the transition metal. The transition metal halide may be supported on a magnesium halide or complexed thereto. This Ziegler-Natta catalyst may also be impregnated onto an inorganic support such as silica or alumina. Complete activation of Ziegler-Natta catalyst in the reactor is achieved by the addition of a cocatalyst, which is typically the organometallic compound as mentioned above. For more details on traditional Ziegler-Natta catalysts, see for example, U.S. Pat. Nos. 3,687,920, 4,086,408, 4,376,191, 5,019,633, 4,482,687. 4,101,445, 4,560,671, 4,719,193, 4,755,495, 5,070,055 all of which are herein incorporated by reference.

Chromium Based Catalyst

Chromium based catalysts can be chosen from, for example, chromium oxide based catalysts and silyl chromate based catalysts. These chromium based catalysts are described in, for example, WO2006130310, incorporated herein by reference.

The chromium oxide catalysts may be $CrO_3$, or any compound convertible to $CrO_3$ under the activation conditions employed. Compounds convertible to $CrO_3$ are, for example, disclosed in U.S. Pat. No. 2,825,721, U.S. Pat. No. 3,023,203, U.S. Pat. No. 3,622,251 and U.S. Pat. No. 4,011,382 and include chromic acetyl acetone, chromic chloride, chromic nitrate, chromic acetate, chromic sulfate, ammonium chromate, ammonium dichromate, or other soluble salts of chromate.

The silyl chromate based catalysts are characterized by the presence of at least one group of Formula I below:

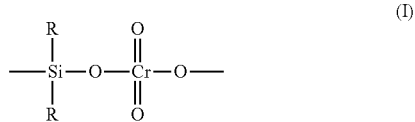

Wherein R, in each occurrence, is a hydrocarbyl group having from 1 to 14 carbon atoms.

Metallocene Catalyst

Generally, metallocene-type catalyst compounds include half and full sandwich compounds having one or more ligands bonded to at least one metal atom. Typical ligand metallocene-type compounds are generally described as containing one or more ligand(s) and one or more leaving group(s) bonded to at least one metal atom. In one preferred embodiment, at least one ligand is [eta]-bonded to the metal atom, most preferably [eta]<5>-bonded to the metal atom.

The ligands are generally represented by one or more open, acyclic, or fused ring(s) or ring system(s) or a combination thereof. These ligands, preferably the ring(s) or ring system(s), are typically composed of atoms selected from Groups 13 to 16 atoms of the Periodic Table of Elements, preferably the atoms are selected from the group consisting of carbon, nitrogen, oxygen, silicon, sulfur, phosphorous, germanium, boron and aluminum or a combination thereof. Most preferably the ring(s) or ring system(s) are composed of carbon atoms such as but not limited to cyclopentadienyl ligands or cyclopentadienyl-type ligand structures or other similar functioning ligand structure such as a pentadiene, a cyclooctatetraendiyl or an imide ligand. The metal atom is preferably selected from Groups 3 through 15 and the lanthanide or actinide series of the Periodic Table of Elements. Preferably the metal is a transition metal from Groups 4 through 12, more preferably Groups 4, 5 and 6, and most preferably the transition metal is from Group 4.

The metallocene catalyst includes a co-catalyst. Generally, the co-catalyst is an organometallic compound containing a metal from group 1, 2, 12 or 13 of the Periodic System of the Elements (Handbook of Chemistry and Physics, 70th Edition, CRC Press, 1989-1990). The co-catalyst may include any compounds known in the art to be used as "co-catalysts", such as hydrides, alkyls, or aryls of aluminium, lithium, zinc, tin, cadmium, beryllium, magnesium, and combinations thereof.

Other examples of processing aids are internal and external donors and stabilizers.

Polymerization is usually carried out in the presence of a Ziegler Natta catalyst or a metallocene catalyst. Polymerization is carried out in a polymerization reactor, optionally with cooling. In most cases the reactor will be operated in adiabatic way, wherein the heat of polymerization is absorbed by warming the incoming monomer stream and/or optionally by evaporating liquid component, like isopentane and hexane, from the reactor, followed by cooling the components and recycling the cooled components to the reactor.

The polyolefins that are prepared are preferably copolymers of olefins. Preferably, the polyolefins are ethylene copolymers and propylene copolymers. For example, LLDPE, VLDPE and propylene copolymers are produced. More preferably, the polyolefin is LLDPE, most preferably LLDPE prepared from ethylene and 1-hexene.

According to step b. of the process according to the invention the polyolefins from the product stream are separated to obtain a purge stream. This can be performed by discharging the contents of the reactor after polymerization into a purge vessel. In the purge vessel the polymer will be separated from gaseous components, like unreacted monomers. Usually the polymer can be purged with an inert gas (like nitrogen) in order to remove residual monomers, which will be sent as part of the purge stream to the vent gas recovery. The purge stream will contain degassed hydrocarbons, diluents, residual monomers, nitrogen and other volatile components.

According to step c. of the process according to the invention liquid components are separated from the purge stream to obtain a liquid fraction. The purge stream will be treated to separate liquids from gaseous components. Treatment can be for example by cooling, by pressurizing followed by cooling and by condensing liquid components. In this way a liquid fraction can be obtained, which contains a number of liquid components, like for example higher alkanes (e.g. hexane), comonomers (e.g. 1-hexene), internal and external donors and the like. Polar components can be separated from the apolar components (like for example hexane and 1-hexene) by known techniques like absorption, distillation and complexing followed by sieving, depending on the nature of the polar components.

According to step d. of the process according to the invention a fraction containing unsaturated hydrocarbons is obtained by treating the liquid fraction with at least one ionic liquid. By the treatment of the fraction containing unsaturated hydrocarbons with ionic liquids alkanes and alkenes can be separated. For example, 1-hexene is separated from pentane or hexane.

Ionic liquids are organic compounds that are liquid at room temperature. They differ from most salts, in that they have very low melting points. They tend to be liquid over a wide temperature range, are not soluble in non-polar hydrocarbons, are immiscible with water, depending on the anion, and are highly ionizing (but have a low dielectric strength). Ionic liquids have essentially no vapor pressure. Most are air and water stable, and they are used herein to solubilize olefin-complexing metal salts. The properties of the ionic liquids can be tailored by varying the cation and anion. The ionic liquids can either be neutral, acidic or basic. Neutral ionic liquids should be used if the desired olefins are not to be isomerized. If it does not matter whether the olefins are isomerized (and if the olefins and/or non-olefins are not acid-sensitive), either neutral or acidic ionic liquids can be used.

Suitable ionic liquids are, for example, described in U.S. Pat. No. 6,623,659 and U.S. Pat. No. 7,435,318.

Separation of alkenes from alkanes with ionic liquids is in itself known in the art. For example U.S. Pat. No. 6,623,659 discloses the separation of olefins from paraffins using ionic liquid solutions. WO 01/98239 describes a process for the purification of olefins by selectively complexing the olefins and separate the olefins from paraffins. U.S. Pat. No. 7,435,318 discloses the use of ionic liquids as selective additives for separation of close-boiling or azeotropic mixtures. In these references separation is described in a refinery type process. The references however do not suggest the incorporation of an olefin/paraffin separation in a polymerization plant and subsequent recycling of the olefins to the polymerization reactor. In the present invention the separation of the olefins from the diluent with the aid of at least one ionic liquid provides as an important advantage, that discharge of olefins like 1-hexene does not have to be performed, but rather a simple and efficient recycling of the monomer can be carried out. Optionally the olefins are purified prior to the recycling, for example by drying or absorption of polar compounds in an absorption column (for example zeolite 3A, 4A or 13X). This purification step may be preferred when the polymerization plant is suitable for the use of different types of catalysts, which can be used interchangeably.

According to step e. of the process according to the invention the fraction containing unsaturated hydrocarbons is recycled to the reaction mixture.

THE BRIEF DESCRIPTION OF THE FIGURE

An example of a process for the polymerization of olefins according to the invention is shown in the FIGURE.

The FIGURE illustrates a polymerization system for the polymerization of ethylene and 1-hexene comprising a polymerization reactor 1 operated as a continuously stirred reactor or fluidized bed reactor, purge vessel 2, vent gas recovery 4, an ionic liquid separator 5, and optional purification vessel 6.

The product stream comprising polyolefin is formed in the polymerization reactor and sent to purge vessel 2. The polyolefin is separated as a product stream 3 from the purge vessel 2 and the purge stream is sent to the gas-liquid separator 4. In the gas-liquid separator the lighter, gaseous components (like nitrogen and ethylene) are separated as a gas and the liquid stream is sent to the ionic liquid separator 5. In the ionic liquid separator 5 liquid mixtures like n-hexane and 1-hexene are separated. Hexene is recycled to the polymerization reactor after optional purification in the purification vessel 6. In the purification vessel 6 hexene can be purified from catalyst residues and other polar components.

Although the invention has been described in detail for purposes of illustration, it is understood that such detail is solely for that purpose and variations can be made therein by those skilled in the art without departing from the spirit and scope of the invention as defined in the claims.

The invention also relates to a polymerization system for the polymerization of olefins, comprising
 a. a polymerization reactor 1 for polymerizing olefins in a reaction mixture comprising monomers, diluent, processing aids to prepare a product stream comprising polyolefins, monomers and diluent,
 b. a purge vessel 2 for removing the polyolefins from the product stream to obtain a purge stream,
 c. a vent gas recovery unit 4 for removing gaseous components from the purge stream to obtain a liquid fraction and
 d. an ionic liquid separator 5 for treating the liquid fraction with at least one ionic liquid to obtain a fraction containing unsaturated hydrocarbons, wherein the system is arranged to recycle the fraction containing unsaturated hydrocarbons to the polymerization reactor 1, optionally after purification of said fraction containing unsaturated hydrocarbons in an optional purification unit 6.

The polymerization system is preferably suitable for carrying out polymerization with at least two incompatible catalyst systems, which can be used alternately. For example the system can be suitable for polymerization with metallocene and Ziegler-Natta catalysts. In conventional polymerization systems, only one of these types of catalysts is being used, and the polymerization system is optimized for either Ziegler Natta catalysts or metallocene catalysts. It is known that these types of catalysts have a different conversion of monomers relative to each other, and also contain catalytic components that will deactivate the other class of catalysts. Changing from one catalyst system to another is therefore cumbersome with a view on the type of catalysts used, but also on the different reactivity towards monomers. In the polymerization system according to the invention, the liquid monomers (like for example 1-hexene) are separated from the liquid fraction from the purge stream and can be recycled back to the polymerization reactor, independently from the catalyst system used. This increases the flexibility of the polymerization system, reduces waist, and increases efficiency.

It is further noted that the invention relates to all possible combinations of features described herein, preferred in particular are those combinations of features that are present in the claims.

It is further noted that the term 'comprising' does not exclude the presence of other elements. However, it is also to be understood that a description on a product comprising certain components also discloses a product consisting of these components. Similarly, it is also to be understood that a description on a process comprising certain steps also discloses a process consisting of these steps.

The invention claimed is:

1. A process for the polymerization of olefins comprising the steps of
   a. Polymerizing olefins in a reaction mixture comprising monomers, diluent, processing aids to prepare a product stream comprising polyolefins, monomers and diluent;
   b. Removing the polyolefins from the product stream to obtain a
   purge stream;
   c. Removing gaseous components from the purge stream to obtain
   a liquid fraction;
   d. Treating the liquid fraction with at least one ionic liquid to obtain a
   fraction containing unsaturated hydrocarbons, wherein the at least one ionic liquid is an organic compound that is liquid at room temperature;
   e. Recycling the fraction containing unsaturated hydrocarbons to
   the reaction mixture, optionally after purification of said fraction containing unsaturated hydrocarbons.

2. The process according to claim 1, wherein the monomers are chosen from the
   group of ethylene, propylene, 1-butene, 1-hexene, 1-octene and mixtures of these monomers.

3. The process according to claim 1, wherein the monomers comprise ethylene and 1-hexene.

4. The process according to claim 1, wherein the polymerization is carried out with the aid of metallocene catalysts or Ziegler-Natta catalysts.

5. The process according to claim 1, wherein the polymerization is carried in the gas phase in a fluid bed.

6. A polymerization system for the polymerization of olefins, comprising
   a. a polymerization reactor (1) for polymerizing olefins in a reaction mixture comprising monomers, diluent, processing aids to prepare a product stream comprising polyolefins, monomers and diluent,
   b. a purge vessel (2) for removing the polyolefins from the product stream to obtain a purge stream,
   c. a vent gas recovery unit (4) for removing gaseous components from the purge stream to obtain a liquid fraction and
   d. an ionic liquid separator (5) for treating the liquid fraction with at least one ionic liquid to obtain a fraction containing unsaturated hydrocarbons, wherein the at least one ionic liquid is an organic compound that is liquid at room temperature,
   wherein the system is arranged to recycle the fraction containing unsaturated hydrocarbons to the polymerization reactor (1), optionally after purification of said fraction containing unsaturated hydrocarbons in an optional purification unit (6).

7. The polymerization system according to claim 6, wherein the system is suitable for carrying out polymerization with at least two incompatible catalyst systems, which can be used alternately.

8. The polymerization system according to claim 7, wherein the system is suitable for polymerization with alternately metallocene and Ziegler-Natta catalysts.

9. The process according to claim 1, wherein the ionic liquids are immiscible with water.

10. The process according to claim 1, wherein the ionic liquids are not soluble in non-polar hydrocarbons.

11. The process according to claim 1, wherein the ionic liquid is neutral, basic, or acidic.

12. The polymerization system according to claim 6, wherein the ionic liquids are immiscible with water.

13. The polymerization system according to claim 6, wherein the ionic liquids are not soluble in non-polar hydrocarbons.

14. The polymerization system according to claim 6, wherein the ionic liquid is neutral, basic, or acidic.

* * * * *